United States Patent [19]

Sugawara et al.

[11] Patent Number: 5,687,038
[45] Date of Patent: Nov. 11, 1997

[54] SERVO METHOD AND DEVICE FOR CONTROLLING HEAD POSITION FOR A HARD DISK DRIVE

[75] Inventors: Takashi Sugawara, Yokohama; Kenji Ogasawara, Fujisawa; Kenichiroh Satoh, Tokyo, all of Japan

[73] Assignee: International Business Machines Corporation, Armonk, N.Y.

[21] Appl. No.: 496,155

[22] Filed: Jun. 28, 1995

[30] Foreign Application Priority Data

Jun. 30, 1994 [JP] Japan .................... 6-150194

[51] Int. Cl.$^6$ .................................. G11B 5/596
[52] U.S. Cl. .................... 360/77.08; 360/77.04
[58] Field of Search ................. 360/77.02, 77.04, 360/77.08, 77.11

[56] References Cited

U.S. PATENT DOCUMENTS

| | | | |
|---|---|---|---|
| 5,404,255 | 4/1995 | Kobayashi et al. | 360/77.04 X |
| 5,436,773 | 7/1995 | Hanson | 360/77.08 X |
| 5,457,586 | 10/1995 | Solhjell | 360/77.04 |
| 5,500,776 | 3/1996 | Smith | 360/77.08 X |

OTHER PUBLICATIONS

Ueno, Servo–Information Demodulation Control System, Apr. 2, 1991 Patent Abstract of Japan for JP 03–76055.
Hirose, Magnetic Disk Device, Apr. 23, 1993 Patent Abstract of Japan for JP–05–10135b.

*Primary Examiner*—Andrew L. Sniezek
*Attorney, Agent, or Firm*—Merchant, Gould, Smith, Edell, Welter & Schmidt, P.A.

[57] ABSTRACT

A target PES value input from a controller and a value from a PES value calculator which corresponds to the displacement of a magnetic head are synthesized. A coefficient applicator applies a predetermined coefficient $K_1$ to the above deviation (multiplication), and a variable coefficient applicator applies a coefficient $K_a$ to the resulting value. The coefficient $K_a$ is varied and set in the variable coefficient applicator in accordance with a value input from a table. The correspondence between the target PES value and the coefficient $K_a$ used as a feedback coefficient for the PES value is stored in the table in advance so that the coefficient $K_a$ is small when the PES value varies sharply and so that the coefficient $K_a$ is large when the PES value is small. The variable coefficient applicator outputs, to a driver, a value to which the coefficient $K_a$ has been applied in accordance with the value from the table.

6 Claims, 12 Drawing Sheets

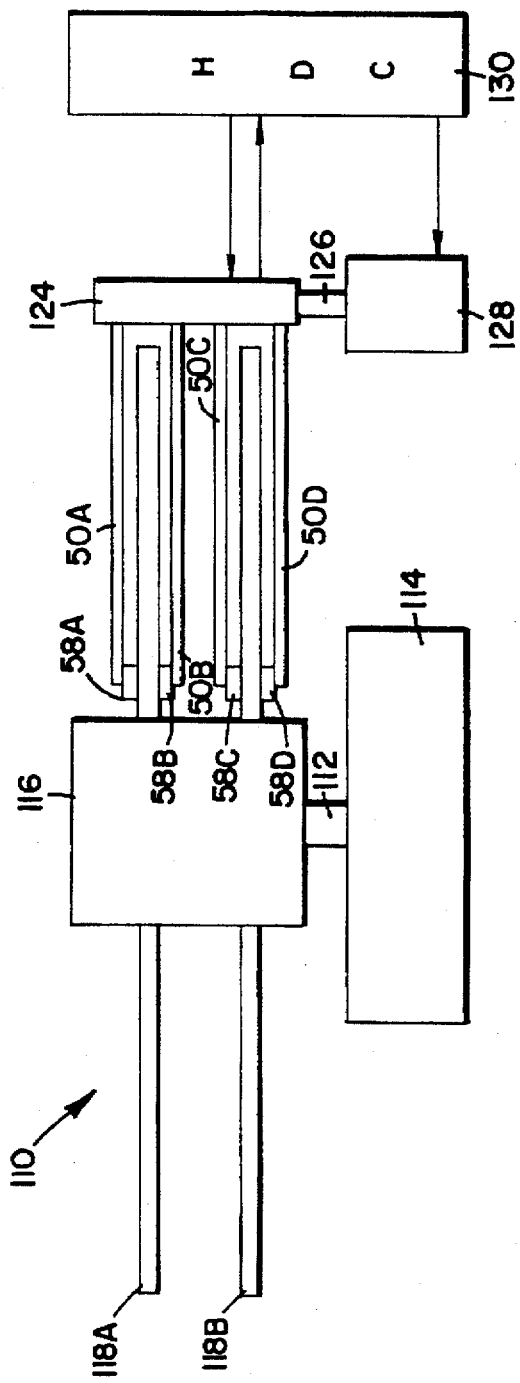
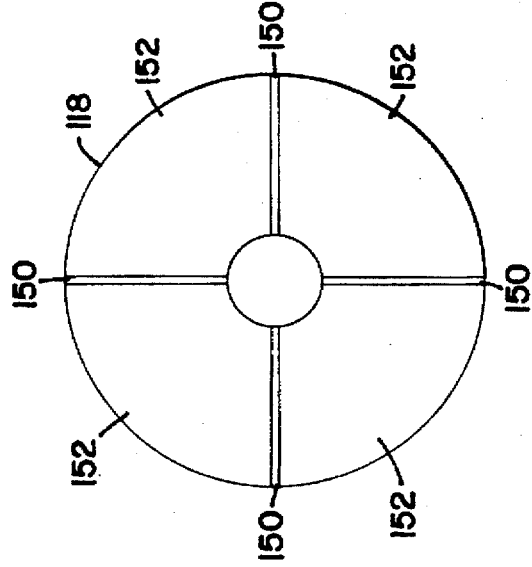

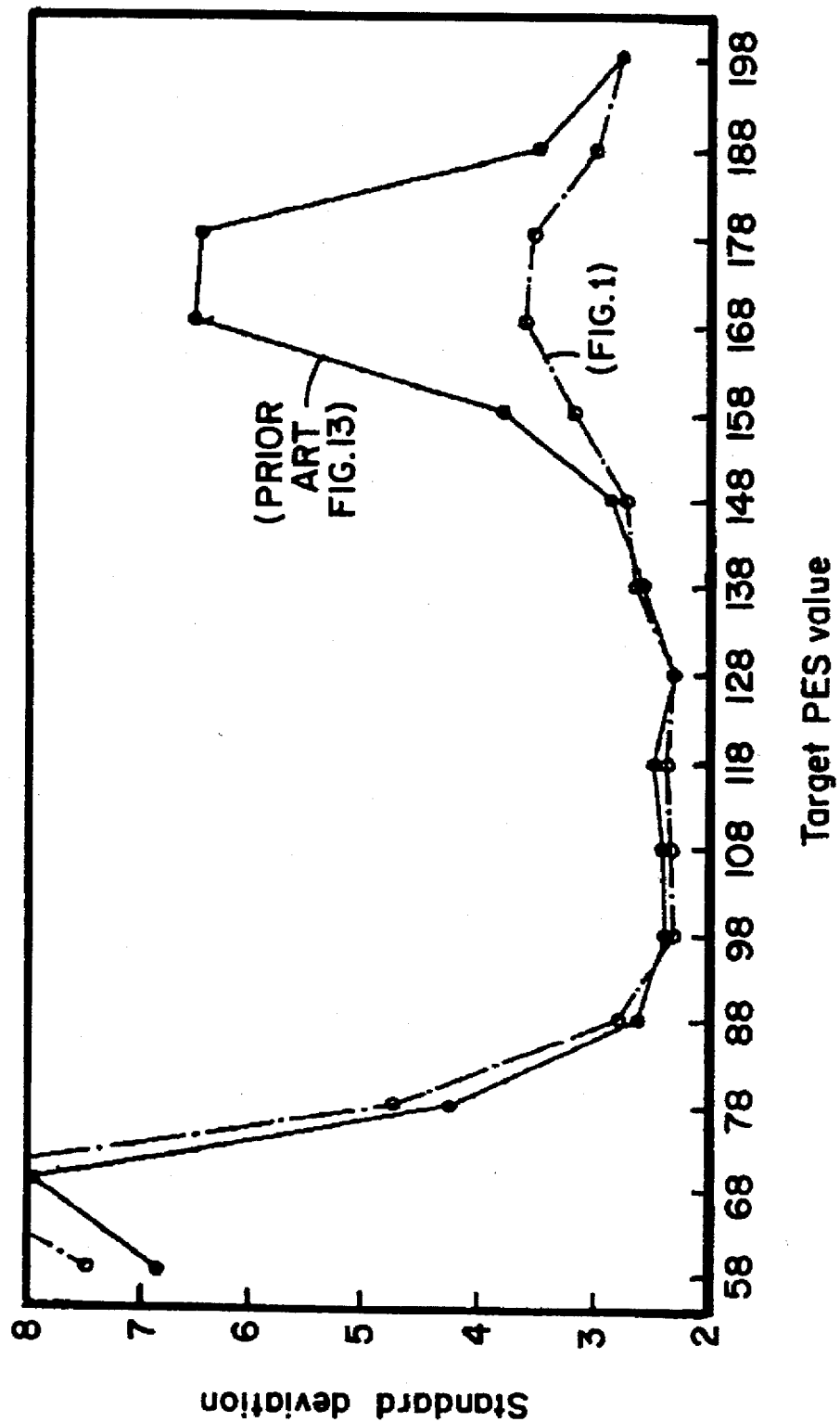

SERVO METHOD AND DEVICE FOR CONTROLLING HEAD POSITION FOR A HARD DISK DRIVE

BACKGROUND OF THE INVENTION

1. Field of the Invention

The present invention relates to a servo method and device for a hard disk drive. In particular, the invention is directed to a servo method and device for a hard disk drive head for positioning the head of the hard disk drive which stores and reproduces information.

2. Description of Related Art

Hard disk drive units ("HDDs") are used as information-storing media for recording massive amounts of information used in computers. HDDs include a plurality of magnetic recording disks with tracks to store information. A magnetic head for reproduction and recording is positioned on the desired track and to reproduce information from the disk.

The capacity of HDDs has recently been increasing as the diversification of computer processing has proceeded. A smaller reproduction and recording head is thus needed to facilitate the provision of HDDs with a larger capacity.

A rotary actuator using a voice coil motor ("VCM") is usually used to position the magnetic head in a specified position on the disk in the HDD. The rotary actuator has a rotation axis outside the disk, and rotates the magnetic head located at its tip to position it in the specified position.

HDDs are required to determine the position of the head moving on the disk because they must carry out magnetic reproduction and storage in any position of a plurality of disks. Servo methods, including a sector servo method, are used particularly in small HDDs. Such disks store surface patterns in different sectors of each disk, and cylinder and sector numbers required for positional control. The sector servo method reproduces servo information written on the disk to determine the track number and the exact position of the head relative to the center of the track. General-purpose servo methods for HDDs use a position error signal ("PES") in servo information to detect an offset from the center of the track.

Conventional writing and reading magnetic resistive ("MR") heads (for example, MIG and thin film heads) are used for both reading and writing, a single optimum gain constant for following the center of the track is set as the servo gain to enable the recording and reproduction head to follow the center of the track as a target.

As is well-known, however, in a head such as an MR head that requires separate reproduction and recording heads, the positions of the reproduction and recording heads are offset slightly from each other. As a result, when the reproduction head attempts to follow the center of the track, the recording head is offset slightly from the center of the track. To reproduce stored data after this data is recorded under these conditions, the reproduction head must be offset from the center of the track by the offset distance between the recording and reproduction heads. The MR head should thus follow not only the center of the track but also a specified position that is offset from the center.

However, since, the servo gain of conventional write and read heads is linear with respect to the PES value, there is a large difference in the servo gain between write and read with an MR head. Thus, when the servo gain is provided with the calibration optimum for recording, it becomes too large for reading, thereby resulting in an unstable read operation. In the conventional HDD devices, this in turn causes a high error rate during reading, or, in turn, a servo gain that is too small for reading, causes unstable writing.

There is, accordingly, a need for a servo method and device which provides improved positioning control.

SUMMARY OF THE INVENTION

In view of the above, it is an object of this invention to provide a servo method for allowing a head comprising separate reproduction and recording heads to stably follow positions within a track when this head is used to record or reproduce data.

This invention provides a servo method for a disk drive that reproduces servo information for identifying track positions from a disk having at least one track including at least one servo region in which the servo information is stored. The reproduced servo information and the predetermined gain information provide feedback for the control of the head to be positioned in a predetermined reference position on the track.

With the invented method, a correspondence between the distance information corresponding to the offset of the head from the reference position and the gain information is stored in advance. The reproduced servo information is then used to derive the distance information corresponding to the offset of the head from the reference position. The gain information corresponding to the distance information obtained and feedback control is carried out using the gain information derived and the reproduced servo information to position the head in the predetermined position on the track. This position may be a reference position.

If the head comprises a reproduction element for reproducing information and a storage element disposed at a specified interval from the reproduction element for storing the information, then the center of the head does not match the center of the track. That is, the center of the head does not match the center of the track when the servo information is reproduced while that stored information is written to an information recording disk, such as when using a sector servo. When both the servo information and the information stored on the information recording disk are reproduced, the center of the head on the track does not match the center of the track. Consequently, each processing requires gain information. Should the gain information corresponding to the specified distance between the elements of the head be included in the correspondence, the feedback control of the head comprising the reproduction and the recording element is not affected by an error in the specified distance.

According to the invention, there is provided a method of controlling a hard disk drive using a head for reproducing stored servo information for identifying a track position from an information recording disk. The disk includes a track with a servo region. The reproduced servo information and predetermined gain information is used to provide a feedback control of the head to be positioned in a predetermined reference position on the track.

The invented method comprises storing a correspondence between a distance information corresponding to an offset of the head from the reference position and the gain information. The distance information corresponding to the offset of the head from the reference position is derived from the reproduced servo information. Referencing a correspondence is effected to derive the gain information corresponding to the distance information, and feedback control is performed using the derived gain information and the servo information to position the head in a predetermined position on the track.

The invention also includes a hard disk drive comprising a head for reproducing information and an information recording disk including a track having a servo region with servo information for identifying a track position.

There is a device for reproducing the servo information from the information recording disk and a device for storing a correspondence between a distance information corresponding to the offset of the head from a reference position and gain information. A distance information derivation device is provided for using the servo information to derive the distance information corresponding to the offset of the head from the reference position.

A feedback control device references the correspondence, reads the gain information corresponding to the derived distance information. The derived gain information and the servo information is used to position the head in a predetermined position on the track.

The invention is further described with reference to the accompanying drawings.

BRIEF DESCRIPTION OF THE DRAWINGS

FIG. 2 is a block diagram illustrating a HDD to which this invention is applicable.

FIG. 3 is an image view of a disk for HDDs.

FIG. 10 is a chart illustrating the relationship between the target PES value and the standard deviation.

DETAILED DESCRIPTION OF THE INVENTION

An embodiment of this invention is described below with reference to the drawings. In this embodiment, the present invention is applied to an HDD 110 employing as a recording and reproduction head a magnetic head that is an MR head. Reference is made initially to a prior art system. This provides a useful basis for understanding the advance of the present invention.

Servo Patterns

Figure 11A:
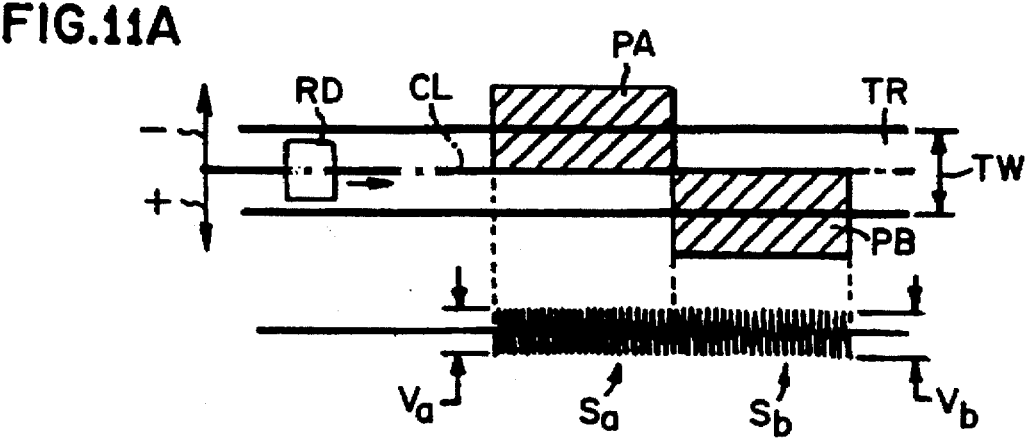
FIGS. 11A, 11B, and 11C describe a method for obtaining the amount of offtrack as a signal.

FIG. 11A shows servo patterns that comprise servo patterns PA arranged continuously in one direction from the center of the track CL and servo patterns PB adjacent to the servo patterns PA which are arranged continuously in the other direction. The servo patterns PA, PB are stored on a track TR with signals of a constant amplitude. An HDD detects the offset of the center of the head from the center of the track based on the magnitude of the amplitude of the reproduction signal of each of these servo patterns PA, PB which is reproduced by the reproduction head RD.

For example, if the read head RD passes the center of the track (see FIG. 11A), the amplitude Va of the reproduction signal Sa of the servo pattern PA matches the amplitude Vb of the reproduction signal Sb of the servo pattern PB. In this case, the amplitude ratio $Va/(Va+Vb)=\frac{1}{2}$, and it is assumed that the reproduction head RD is located at the center of the track TR. The value of $Va/(Va+Vb)$ is simply referred to as the PES value.

Figure 11B:
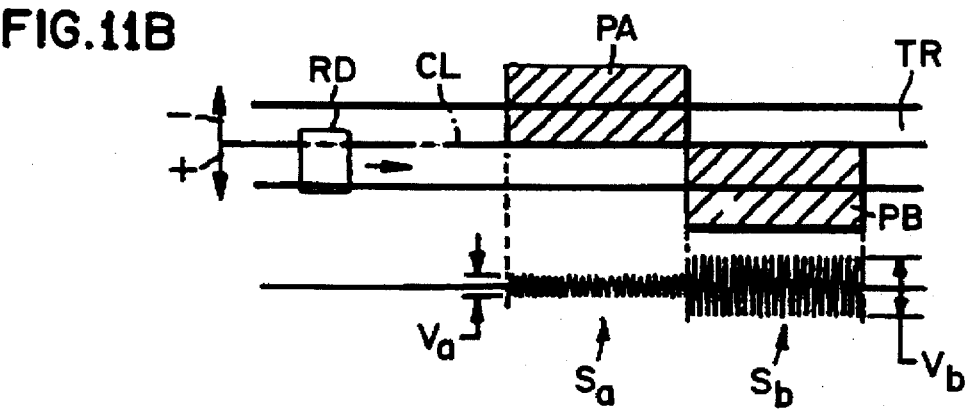

In addition, if the read head RD is offset from the track in one direction as shown in FIG. 11B, that is, the read head RD is offset to the right (the direction of the +arrow in FIG. 11) from the forward direction of the head RD, the amplitude Va of the read signal Sa of the servo pattern PA decreases while the amplitude Vb of the read signal Sb of the servo pattern PB increases. Thus, $Va/(Va+Vb)<\frac{1}{2}$. The PES value becomes one-half or less, indicating that the position of the read head RD is offset to the right from the center of the track in the forward direction.

Figure 11C:
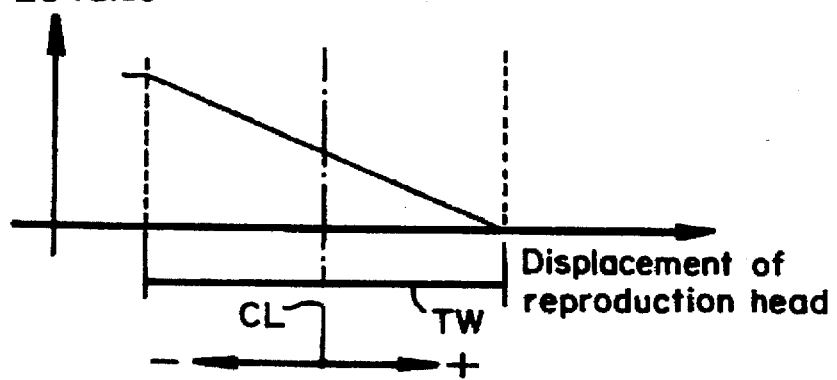

Thus, if the sensitivity of the read head RD is approximately uniform on a track of a width Tw, the relationship between the amount of offtrack and the PES value is ideally linear as shown in FIG. 11C. The servo gain should thus be set to linearly correspond to the PES value to control the actuator so that the center of the read head RD is located at the center of the track CL.

Prior Art

Figure 13:
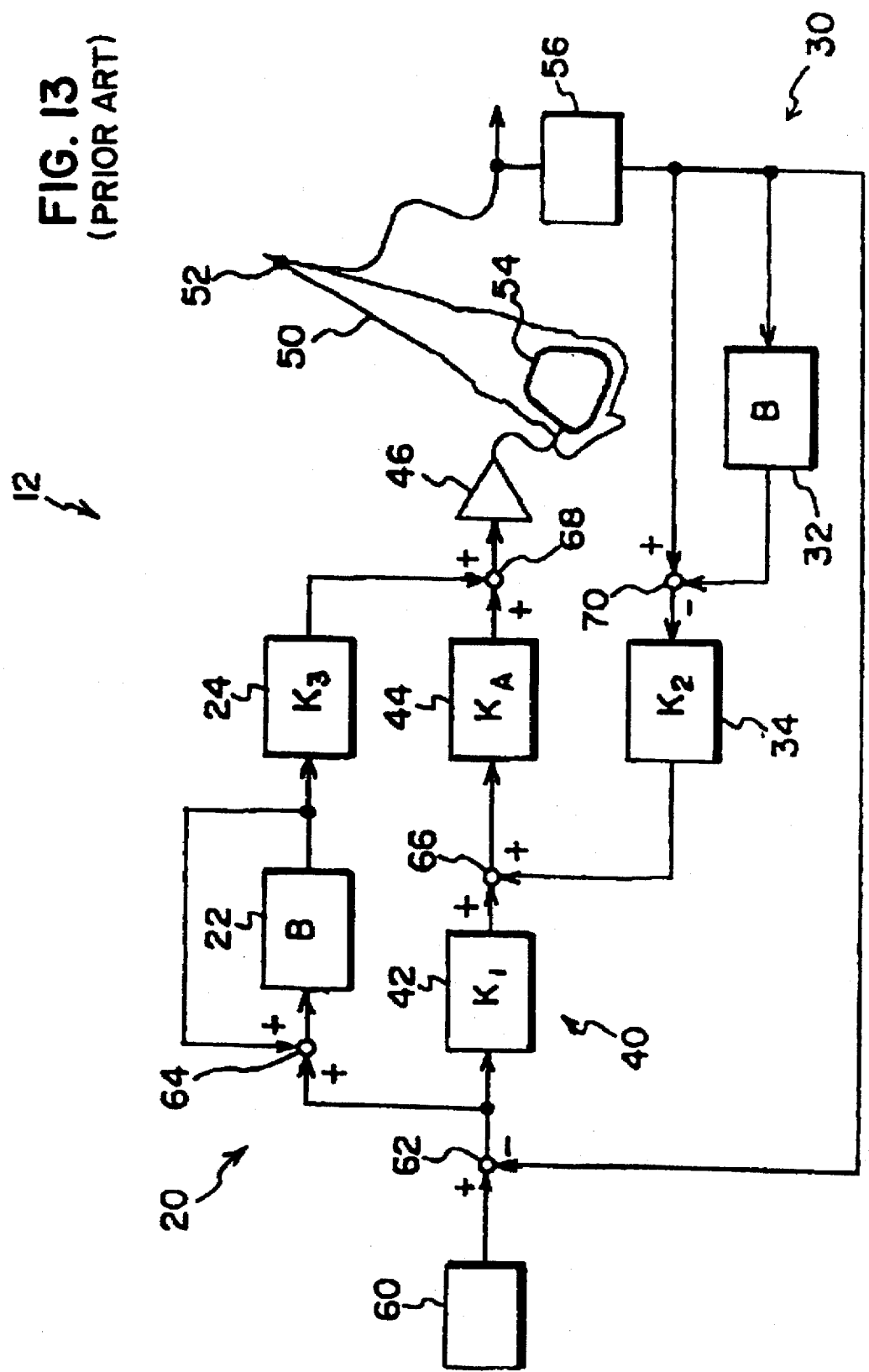
FIG. 13 is a functional block diagram of a conventional servo controller.

FIG. 13 shows a prior art example of the functional blocks of a servo controller incorporated in a conventional HDD. This servo controller 12 has a driver 46 for supplying a current to a voice coil 54 that turns an actuator 50 with a recording and read head 52 attached to the end of it. The output signal of the recording and read head 52 is input to a PES value calculation means 56. The PES value calculation means 56 calculates digital data which is used as a PES value based on the analog output signal of the recording and read head 52 produced by AD conversion. The servo controller 12 is a PID control system comprising an integral system 20, a differential system 30, and a comparison system 40.

The comparison system 40 determines the deviation between the target value and the current displacement in proportion to the acceleration to determine the value of a current supplied to the voice coil 54, and comprises a synthesis means 62 and a coefficient application means 42, 44. The PES value used as a target for positioning the recording and reproduction head is input to one input of the synthesis means 62 from a target PES value output means 60, while digital data output from the PES value calculation means 56, that is, the value corresponding to the current displacement of the recording and read head 52 is input to the other input the deviation between the two values is then output. Predetermined coefficients $K_1$, $K_A$ are applied to this deviation (multiplication), and the resulting value is output to a driver 46.

The differential system 30 attempts to quickly reduce and stabilize the deviation between the target value and the current displacement, and comprises a delay means 32, a synthesis means 70, and a coefficient application means 34. The synthesis means 70 outputs the difference between digital data from the PES value calculation means 56 and digital data delayed for a specified time, that is, the last digital data. This output value is multiplied by a predetermined coefficient $K_2$, and the resulting value is synthesized by a synthesis means 66 between the coefficient application means 42 and 44 in the comparison system 40.

The integral system 20 compensates for steady errors to quickly reduce and stabilize any deviations, and comprises a delay means 22, a synthesis means 64 and 68, and a coefficient application means 24. The synthesis means 64 synthesizes the deviation data from the synthesis means 62 and the data delayed for a specified time by the delay means 22, that is, the last digital data (addition). The coefficient application means 34 multiplies the predetermined coefficient $K_2$ by the values output via the delay means 22 and the resulting value is synthesized by the synthesis means 66 between the coefficient application means 42 and 44 in the comparison system 40. Consequently, since the repetition of the above steps allows integration even with a slight deviation, the deviation can be automatically controlled to be zero. The synthesis means 68 may be located before the coefficient application means 44.

Figure 12A:
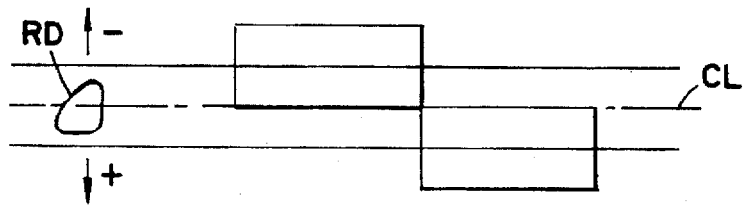
FIGS. 12A, 12B, and 12C describe the relationship between the position of a head with a nonuniform characteristic and various other characteristics.
Figure 12B:
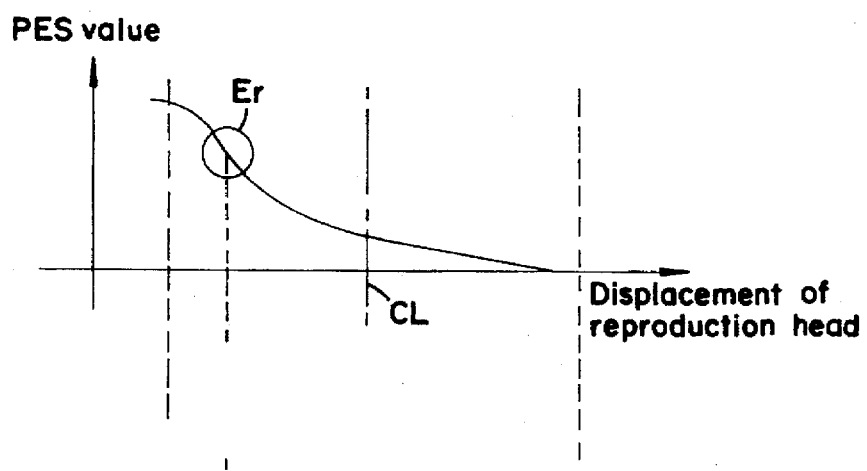

However, if the sensitivity of the reproduction head RD is not uniform, for example, the "+" sensitivity is larger than the "−" sensitivity as shown in FIG. 12B, then the relationship between the amount of offtrack and PES value is nonlinear. Thus, where the PES value varies sharply relative to the amount of offtrack in the region Er where the gradient of the line representing the relationship between the PES value and displacement is large, the PES value changes substantially even when the position of the reproduction head RD changes slightly, resulting in a large servo gain in the control of the actuator compared to other positions.

Figure 12C:
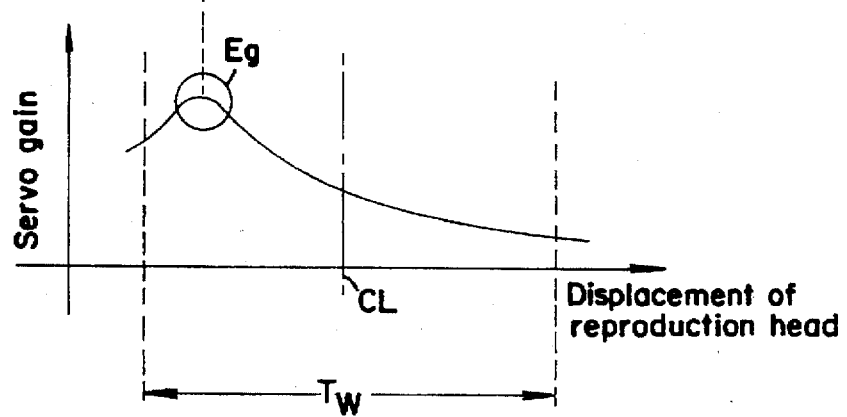

That is, as seen from the relationship between the amount of offtrack and servo gain in FIG. 12C, in a region Eg corresponding to a region Er, the servo gain involves a sudden change and the control of the actuator is unstable. Consequently, if the sensitivity of the reproduction head RD is not uniform, the servo gain increases and decreases in several positions on a single track. This frequently occurs if an MR head is used as a reading head. Therefore, if the servo gain is set to linearly correspond to the PES value, then this does not allow the center of the head to be located at the center of the track CL.

FIG. 2 shows a HDD 110 in accordance with this invention. There is a drive 114 that rotates a shaft 112 at a high speed. The shaft 112 has a cylindrical support 116 attached thereto, and the support 116 has a plurality of disks 118A, 118B (two in FIG. 2) installed on the outer circumferential surface thereof at a specified interval. The disks 118A, 118B have a disk shape and a specified thickness. The disks 118A, 118B are made of a hard material, and have a magnetic material coated on both sides for use as recording surfaces. An opening of substantially the same diameter as the outer diameter of the support 116 is drilled in the center of the disks 118A, 118B. The support 116 is inserted into the opening, and the disks 118A, 118B are fixed to the outer circumferential surface of the support 116. The disks 118A, 118B are thus rotated integrally with the support 116 when the shaft 112 is rotated by the drive 114.

As shown in FIG. 3, each of the recording surfaces of the disks 118A, 118B has a plurality of servo regions 150 radially formed, and the rest of the surface is a data track region 152. Recorded in the servo regions 150, servo signals such as burst patterns indicating the arrangement direction of data tracks, special code (a nonsignal region of about 1 µs) indicating the beginning of a pattern, and Gray code (cyclic binary code) representing the address of each data track information for generating a sector pulse signal SP representing the end of the servo region 150 (the beginning of a sector) is recorded at the end of the servo region 150 in the direction of rotation. A plurality of data tracks is formed radially and concentrically at a pitch P. Information is written to each data track in the direction of rotation of the disks 118A, 118B using a magnetic head as described below.

The HDD 110 includes magnetic heads 58A to 58D of a specified gap width and length provided so as to correspond to each recording surface of the disks 118A, 118B. Each magnetic head 58A to 58D comprises a reproduction element that acts as an MR head to read information and a recording element for writing information. Each magnetic head 58A to 58D is attached to the end of the corresponding access arm 50A to 50D, and held at a small distance (for example, about 0.1 to 0.2 micron) from the corresponding recording surface of the disks 118A and 118B. The trailing ends of the access arms 50A to 50D are attached to a support section 124. The support section 124 is fitted to a drive 128 via a shaft 126, and the access arms 50A to 50D are turned when the drive 128 rotates through a specified angle. The turning of the access arms 50A to 50H moves each magnetic head 58A to 58D radially (see FIG. 3) on each recording surface of the disks 118A, 118B until it is positioned in a specified section on the recording surface.

The drive 128 is connected to a hard disk controller 130 (referred to as an HDC below) including a microcomputer. The HDC 130 is in turn connected to each of the magnetic heads 58A to 58D for recording and reproducing information. The HDC 130 also includes a controller 61 (see FIG. 1) and a servo controller 10. The drive 128 comprises a driver 46 including a digital-analog converter (D/A) and an amplification circuit (AMP), and a voice coil 54 such as a voice coil motor (VCM). Consequently, when the voice coil 54 rotates through a specified angle in response to a signal output from the HDC 130, the access arms 50A to 50D rotate through a predetermined angle.

Next, the servo controller 10 incorporated in the HDD 110 of this embodiment is described in detail. For the convenience of the following description, the magnet head 58A is described by way of example. In addition, since the servo controller 10 of this embodiment has a configuration approximately similar to that of the servo controller 12 described in the section regarding the prior art, the corresponding components carry the same reference numerals as in that section and a detailed description of them is omitted.

Figure 1:
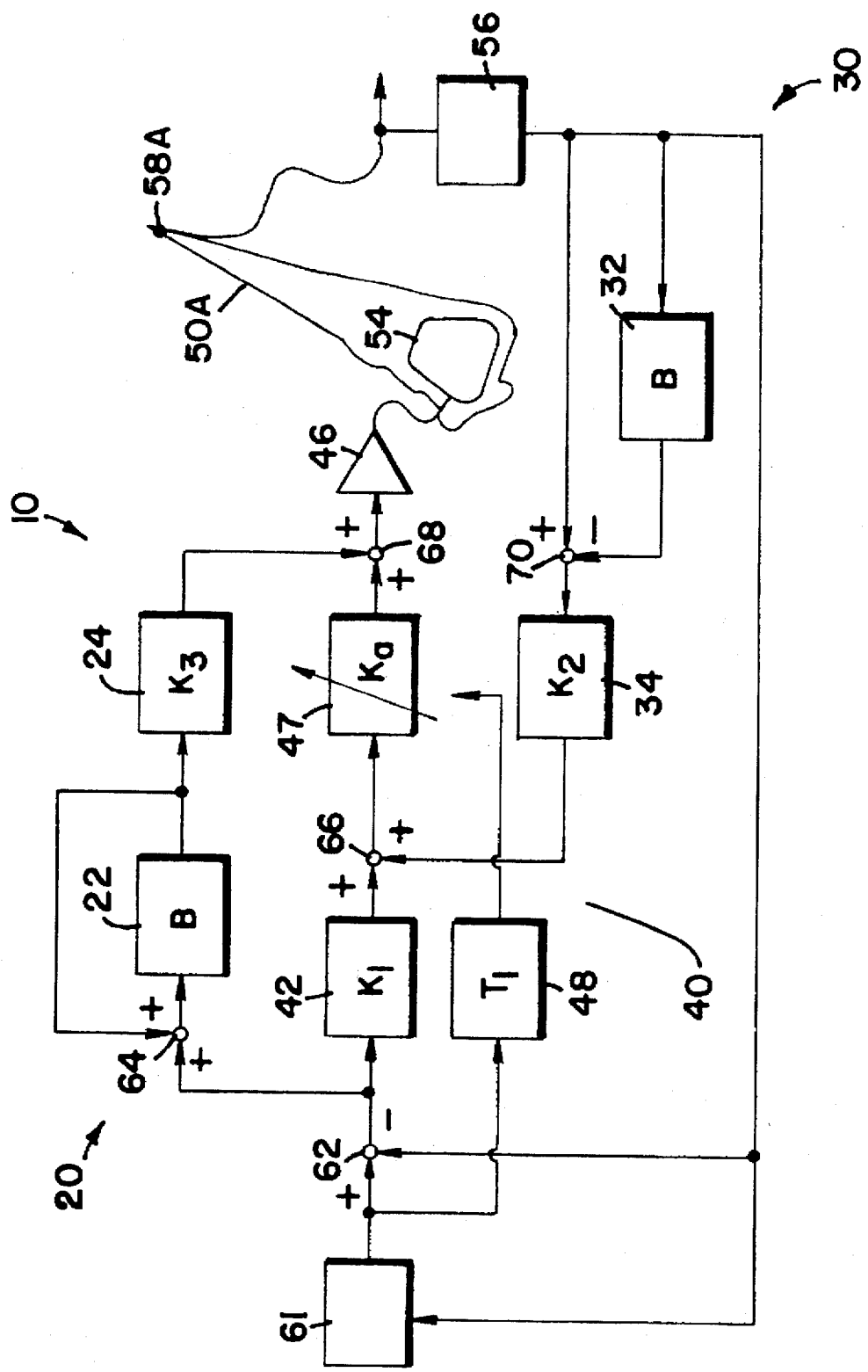
FIG. 1 is a functional block diagram of a servo controller to which the present invention is applicable.

FIG. 1 is a functional block diagram illustrating the servo controller 10 of this embodiment. Digital data output from a PES value calculation means 56 is also input to a controller 61. The PES value calculation means 56 and controller 61 may be integrated.

A comparison system 40 comprises a synthesis means 62, coefficient application means 42, a variable coefficient application means 47, and a table 48. The PES value used as a target for positioning the magnetic head 58A that is an MR head is input from the controller 61 to one input of the synthesis means 62, while the digital data output from the PES value calculation means 66, that is, the value corresponding to the current displacement of the magnetic head 58A, is input to the other; the deviation between the two values is then output. A predetermined $K_1$ is applied to this deviation (multiplication), and the resulting value is input to the variable coefficient application means 47. The variable coefficient application means 47 varies and sets a coefficient $K_a$ in accordance with a value input from the table 48. The correspondence between the PES value used as a target and the coefficient used as a gain constant for the PES value is stored in the table 48 in advance so that the coefficient $K_a$ is small when the PES value varies sharply and that the coefficient $K_a$ is large when the PES value is small. The variable coefficient application means 47 applies the coefficient $K_a$ set in accordance with the value input from the table 48 to the value input from a synthesis means 66 (multiplication); the resulting value is then output to a driver 46.

The description of the differential system 30 and the integral system 20 is omitted because they are similar to those in the section on the prior art. A synthesis means 68 may be located before the coefficient application means, namely driver means 46.

Next, the MR head used in this embodiment is described in comparison with the conventional head. In the following description, it is assumed that the head is positioned in the center of the track when the width of the track is 256 and the PES value is 128.

Figure 4:
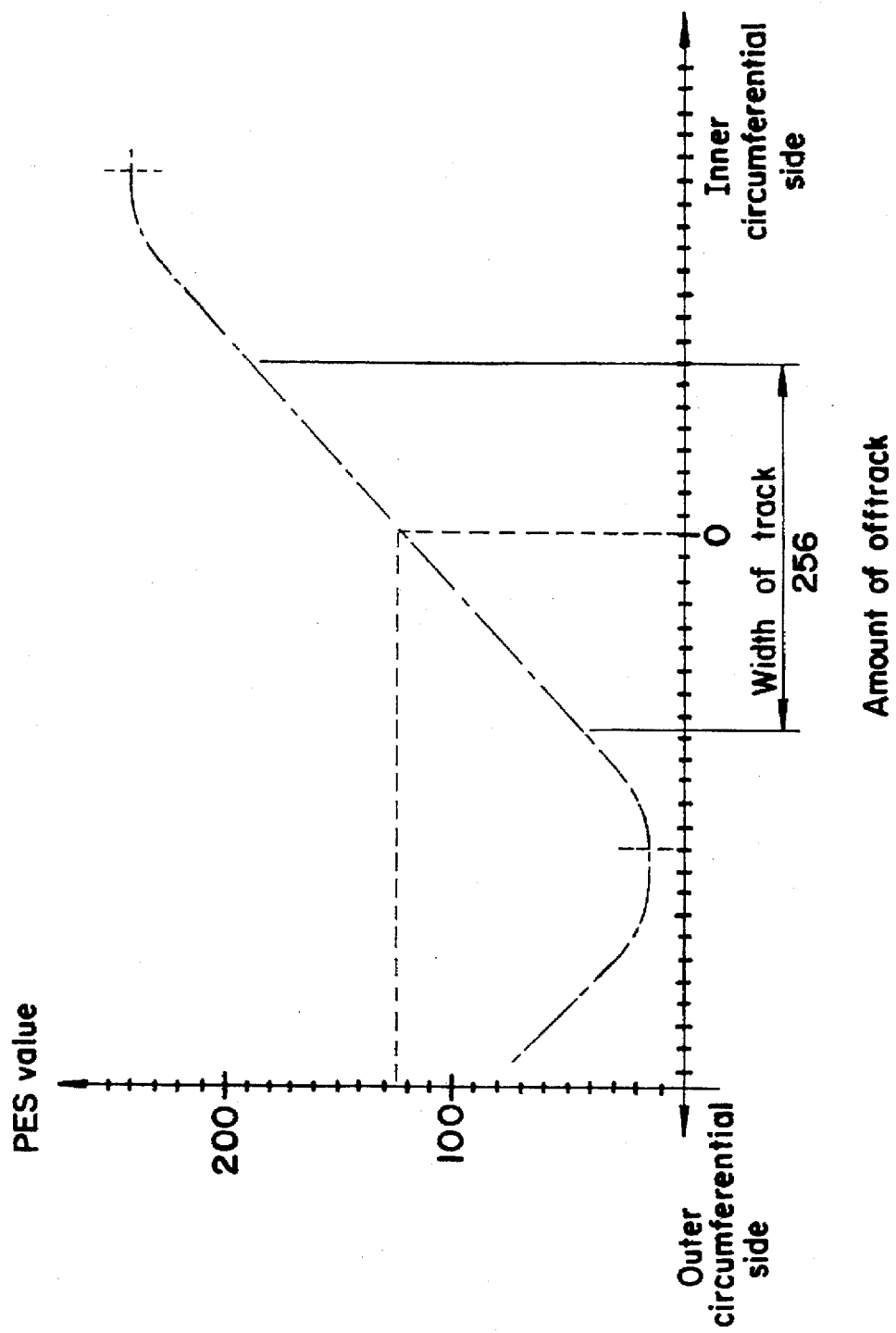
FIG. 4 is a chart illustrating the relationship between the amount of offtrack and the PES value for a conventional servo controller.

FIG. 4 shows that the conventional head does not have to seek a position other than the center of the track and that a servo system is used to provide feedback for the control of the center of the head to follow the center of each track because the relationship between the amount of offtrack of the head from the center of the track and the PES value= A/(A+B) is linear and a common head gap is used for both recording and reproduction.

The MR head requires separate head gaps for recording and reproduction. Thus, if data is recorded while the center of the track is being followed using the reproduction gap, then the data is written in a position offset by the distance equal to the difference between the reproduction and the recording gap. To read the data, the reproduction gap must be offset from the center of the track by the same distance.

Figure 5:
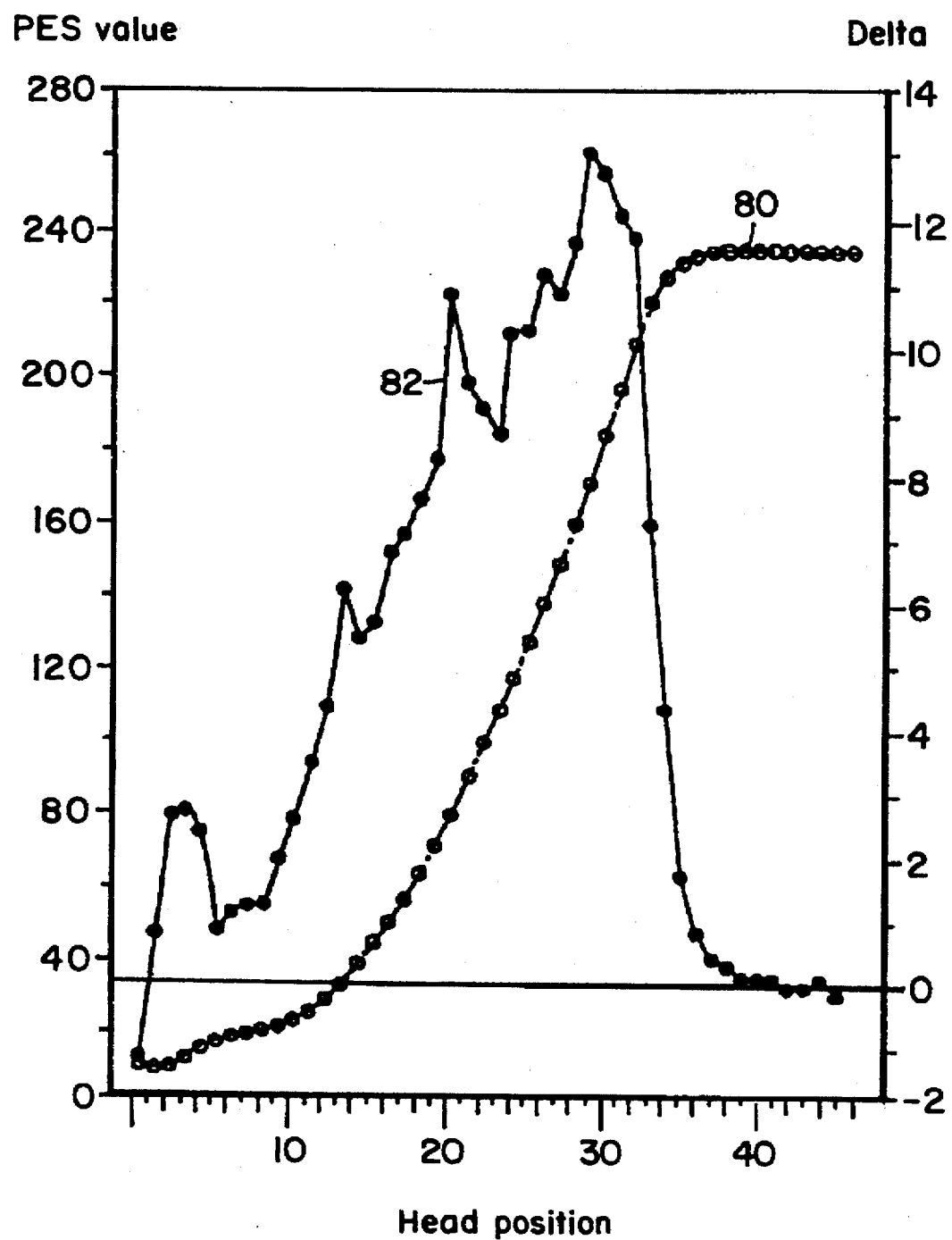
FIG. 5 is a chart illustrating the relationship between the position of a magnetic head and the PES value.

FIG. 5 shows that a characteristic 80 indicating the relationship between the amount of offtrack of the MR head and the PES value is not linear as in FIG. 4 (linear). It is nonlinear and like a quadratic curve. The difference delta between the PES value of the characteristic 80 and the PES value of the linear characteristic at each of these sample points is shown as a characteristic 82. In the characteristic 82, a large value means that the PES value varies sharply due to a slight change in head position. In the characteristic 82 in FIG. 5, the difference delta is largest when the PES value is about 170 to 180.

A HDD employing an MR head thus is required to seek positions other than the center of the track and has a nonlinear relationship between the amount of offtrack and the PES value.

Figure 6:
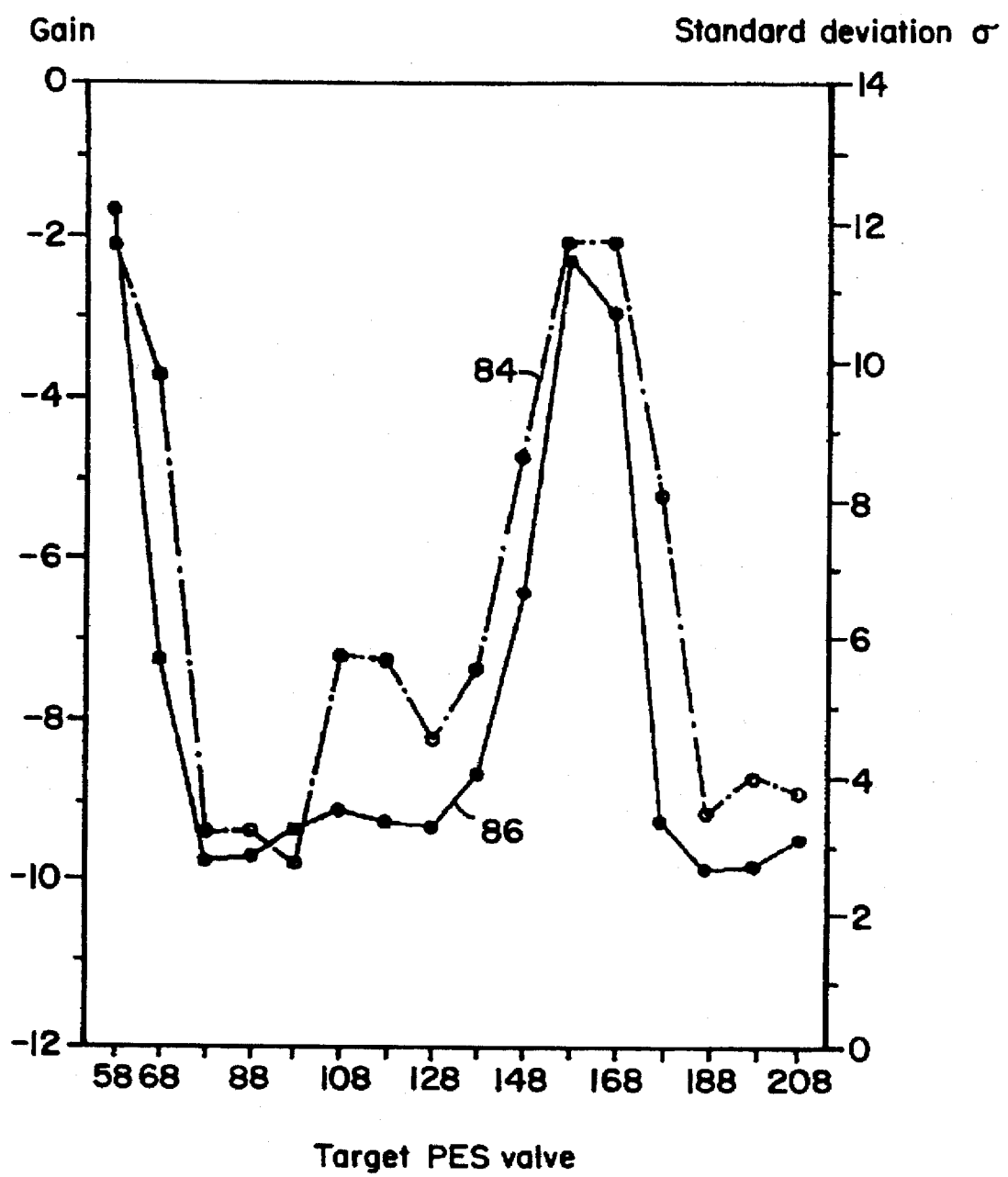
FIG. 6 is a chart illustrating the relationship between the target PES value and the gain.

In FIG. 6, a characteristic 84 indicates the relationship between the gain and PES value at a phase of 0°. This absolute value of the gain indicates a gain margin. In addition, a characteristic 86 indicates the relationship between the standard deviation G and the head position when 500 PES values are sampled continuously. The standard deviation σ indicates the degree of instability in the track-following operation.

As can be seen from FIG. 6, the gain margin is related closely to the standard deviation σ. That is, the standard deviation σ is large when the gain margin is small and the PES value is within a range of 158 to 168, whereas it is small where the gain margin is large. The inventors experimented with other HDDs with a few changes in gain margin over all of the tracks to confirm that the standard deviation σ of the head is approximately the same and stable over all of the tracks.

Thus, when the delta is larger, the servo system for positioning the MR head is more sensitive than for other positions with smaller delta. Consequently, the gain for the PES value for controlling an actuator is large and the gain margin is small where the difference delta is large. The track-following operation becomes more unstable as the gain margin decreases. As can be seen from the above, the nonlinearity of the head is related closely to the instability of the servo system.

Figure 7A:
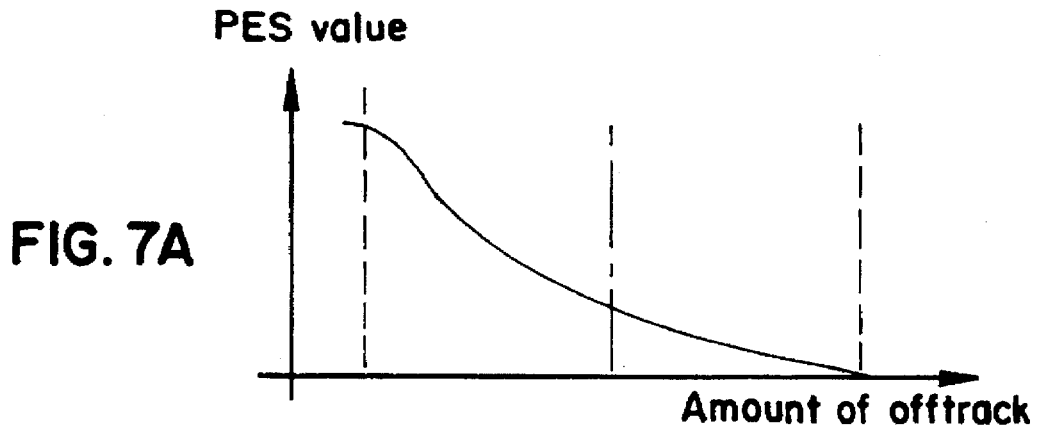
FIGS. 7A, 7B, 7C and 7D describe a method for setting a coefficient for providing a constant servo gain in this embodiment.
Figure 7B:
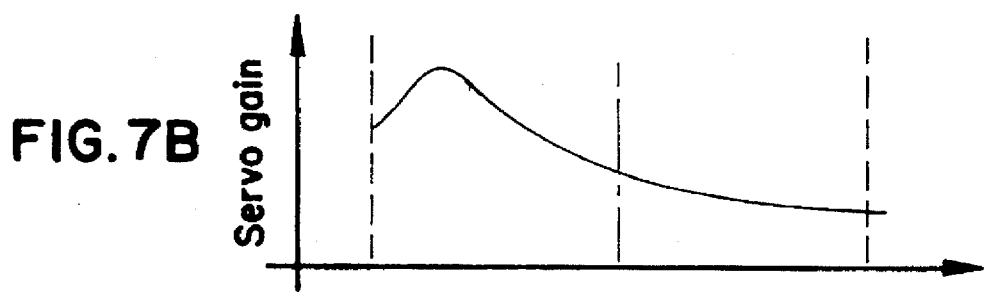
Figure 7C:
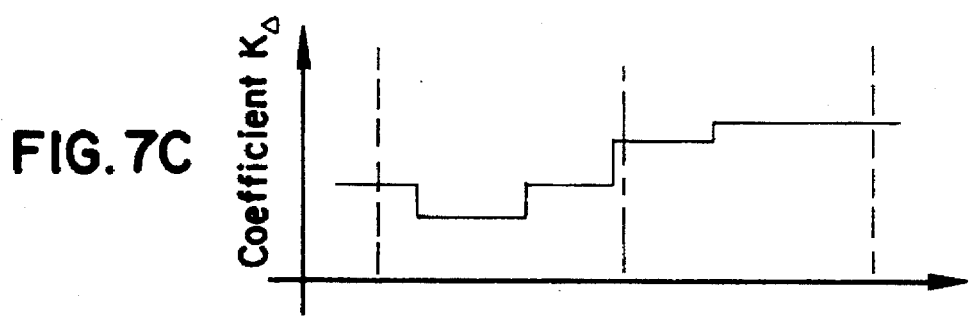
Figure 7D:
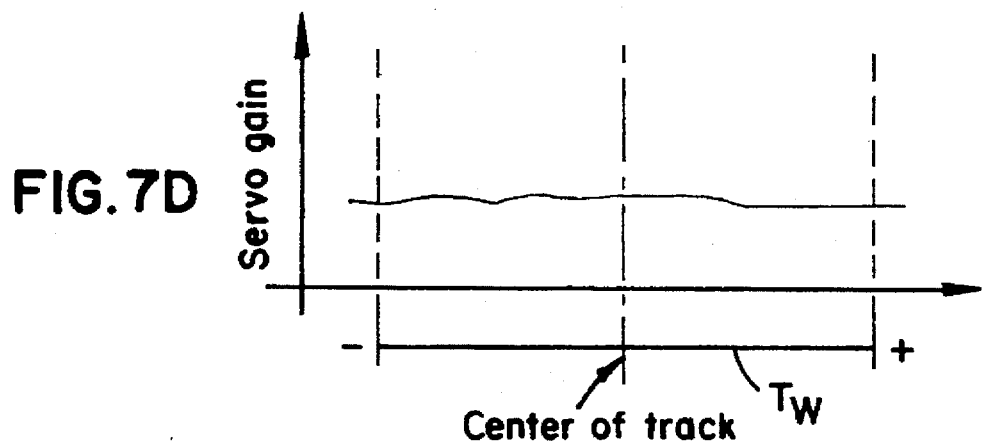

Next, the operation of the periphery of the servo controller 10 incorporated in the HDD 110 of this embodiment is described in detail. If the characteristic of the magnetic head is nonlinearity between the amount of offtrack and the PES value, as shown in FIG. 7A, the servo gain is large when the change rate of the PES value is largest. It is small when the change rate is smallest, as described above in FIG. 7B, because the conventional gain constant involves a constant coefficient. In the preferred embodiment, the table can be referenced to vary the coefficient $K_a$ to correspond to the target PES value. Thus, when the variation of the PES value is large, the coefficient $K_a$ is given a small value. This allows the servo gain to have a constant value. When the variation of the PES value is small, the coefficient $K_a$ is given a large value. This allows the servo gain to have a constant value. As a result, as shown in FIG. 7 (D), the servo gain is approximately constant for any amount of offtrack, resulting in an optimum following performance for any amount of offtrack.

In this manner, the optimum gain constant, that is, the optimum coefficient $K_a$ for a target PES value is measured and stored in advance in microcode as a table. If a target PES value is input when the magnetic head actually starts seeking, the optimum gain constant is determined from the table in accordance with the value and applied to the servo system as the coefficient $K_a$.

Figure 8:
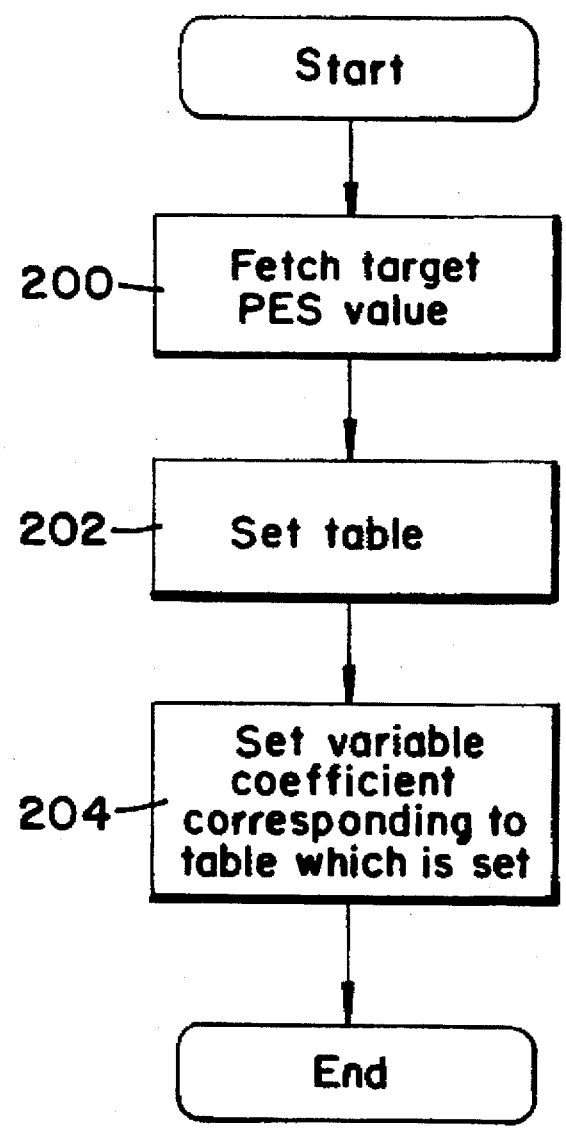
FIG. 8 is a flowchart describing the flow of processing by the servo controller of this embodiment.

The above operation is described using the processing routine shown in FIG. 8. When the magnetic head starts seeking, a target PES value is obtained in step 200 of the servo coefficient setting routine in FIG. 8. In the subsequent step 202, the table 48 is used to create a table based on a one-to-one correspondence between the target PES value and the coefficient. In subsequent step 204, the table which has been created is referenced to set a variable coefficient $K_a$ for the variable coefficient application means 47.

An example of an operation in this case is shown below. First, the gain constant is set to the default. Each target PES value is then set, a current of 475 Hz is applied to the voice coil, and the response is calculated to determine the optimum the gain constant. These values are stored in the table as gain constants for the respective target PES values. For the magnetic head shown in FIG. 6, the gain constant is small when the PES value is within a range of 158 to 168 and the gain is very large, whereas it is large where the gain is small. Thus, since, in this embodiment, the use of a variable coefficient allows the gain constant for feedback control to vary in accordance with the target PES value, even when the magnetic head has a nonlinear PES value, the servo system does not become instable despite changes in gain within a single track, and the optimum track-following operation can be performed at each position.

Figure 9:
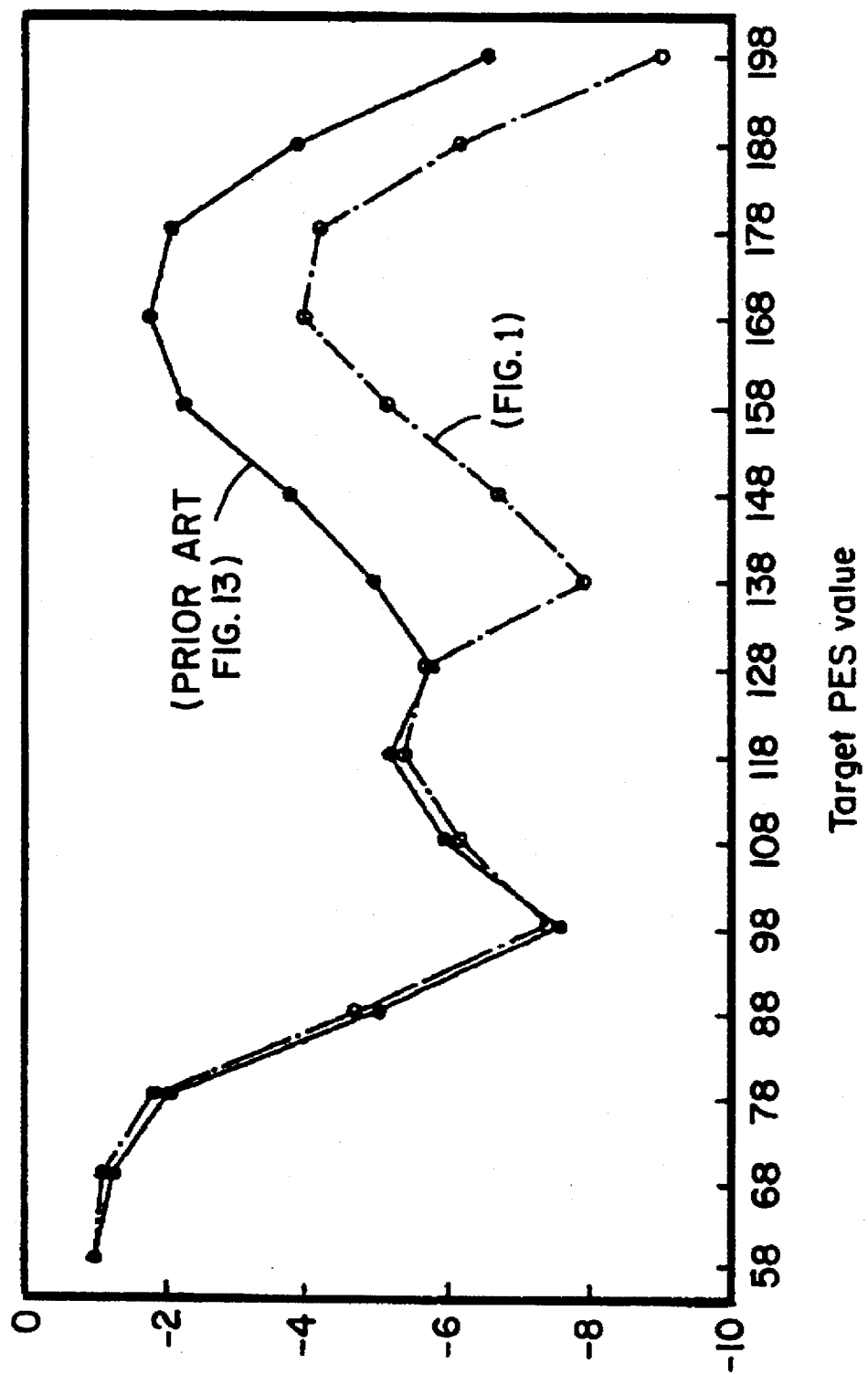
FIG. 9 is a chart illustrating the relationship between the target PES value and the gain margin.

A servo controller 10 (FIG. 1) to which the servo system of the above embodiment is applied was experimentally produced and compared with a conventional servo controller 12 (FIG. 13) with the results in FIGS. 9 and 10. FIG. 9 demonstrates the relationship between the gain and target PES value at a phase of 0°. FIG. 10 demonstrates the relationship between the target PES value and the standard deviation σ of 1,000 responsive PES values sampled after a track-following operation for each target PES value. The solid line in FIGS. 9 and 10 indicates the results of the experiment with the servo controller 12 (FIG. 13). The alternate dot-dash line indicates the results of the experiment with the servo controller 10 (FIG. 1) to which the servo system of the embodiment is applied.

As can be seen from the figures, for the conventional servo controller, the gain margin is smaller when the target PES value is within a range of about 148 to 188. On the contrary, the standard deviation σ is larger within this range. In the servo controller of this embodiment, although the gain constant for the target PES value>129 is 75% of that of the conventional servo system, FIG. 9 clearly indicates that the gain margin of this embodiment is higher than that of the conventional servo controller when the target PES value is 138 or more. The standard deviation σ that is large when the target PES value is within a range of about 158 to 188 decreases with the change in gain margin. There is no effect from the change in gain margin when the standard deviation σ is small.

For example, if the target PES value is set to 168 for seeking during reproduction, the offset of the reproduction/recording gap causes the conventional servo controller to be very instable during reproduction, resulting in a high soft error rate (recoverable error rate). However, a decrease in the gain allows the servo controller of this embodiment to provide a stable track-following operation during reproduction, resulting in a low soft error rate.

Many other forms of the invention exist, each different from the other in matters of detail only.

What is claimed is:

1. A method of controlling a hard disk drive using a MR head for reproducing stored servo information for identifying a track position from an information recording disk, the disk having a track with a servo region, and using the reproduced servo information and predetermined gain information to provide a feedback control of the head to be positioned in a predetermined reference position on the track, the method comprising:
   a. storing a correspondence between distance information of an offset of the head from the predetermined reference position and the gain information;
   b. deriving, from the reproduced servo information, the distance information corresponding to the offset of the head from the predetermined reference position;
   c. referencing the correspondence to obtain a derived gain information corresponding to the distance information; and
   d. performing feedback control using the derived gain information and the servo information to position a center of the MR head in a predetermined offset position relative to a center of a track.

2. A hard disk drive comprising:
   a head for reproducing information including an MR head having a magnetoresistive effect;
   an information recording disk including a track having a servo region with servo information for identifying a track position;
   a device for reproducing the servo information from the information recording disk;
   a device for storing a correspondence between a distance information corresponding to an offset of the head from a reference position and gain information;
   a distance information derivation device for using the servo information to derive the distance information corresponding to the offset of the head from the reference position; and
   a feedback control device for referencing the correspondence, for reading the gain information corresponding to the derived distance information, and for using the derived gain information and the servo information to position a center of the head in a predetermined offset position relative to a center of a track.

3. A hard disk drive as claimed in claim 2 wherein the head includes a reproduction element for reproducing information and an information storage element disposed at a specified interval from the reproduction element.

4. A servo method for a hard disk drive for using a MR head that at least reproduces information and has sensitivity which is not uniform to reproduce servo information for identifying a track position from an information recording disk comprising at least one track including at least one servo region in which said servo information is stored and using the reproduced servo information and predetermined gain information to provide feedback for the control of said head to be positioned in a predetermined reference position on said track;
   wherein the correspondence between the distance information corresponding to the offset of said head from said reference position and said gain information is stored in advance;
   said reproduced servo information is used to derive the distance information corresponding to the offset of said head from said reference position;
   said correspondence is referenced to derive the gain information corresponding to the distance information obtained; and
   feedback control is carried out using the gain information derived and the reproduced servo information to position a center of said head in the predetermined offset position relative to a center of said track which may be said reference position.

5. A hard disk drive comprising:
   a head that at least reproduces information and has sensitivity, part of which is not uniform, including an MR head, having a magnetoresistive effect;
   an information recording disk comprising at least one track including at least one servo region in which said servo information for identifying a track position is stored;
   a reproduction device for reproducing said servo information from said information recording disk;
   a storage device for storing the correspondence between the distance information corresponding to the offset of said head from said reference position and gain information;
   a distance information derivation device for using said reproduced servo information to derive the distance information corresponding to the offset of a center of said head from said reference position; and
   a feedback control device for referencing said correspondence, reading the gain information corresponding to the distance information derived, and using the read gain information and the reproduced servo information to position the center of said head in the predetermined offset position relative to a center of said track which may be said reference position.

6. A hard disk drive in accordance with claim 5 wherein said head comprises a reproduction element for reproducing information and a storage element disposed at a specified interval from the reproduction element for storing the information.

* * * * *

UNITED STATES PATENT AND TRADEMARK OFFICE
CERTIFICATE OF CORRECTION

PATENT NO. : 5,687,038

DATED : NOVEMBER 11, 1997

INVENTOR(S) : SUGAWARA ET AL.

It is certified that error appears in the above-identified patent and that said Letters Patent is hereby corrected as shown below:

Column 7, line 13, "on" should read —in—.

Column 7, line 55, "G" should read — $\sigma$ —.

Signed and Sealed this

Ninth Day of March, 1999

*Attest:*

Q. TODD DICKINSON

*Attesting Officer*    *Acting Commissioner of Patents and Trademarks*